Aug. 12, 1958  D. E. BEATTY  2,847,259
SCAFFOLD BRACE FASTENING MEANS
Filed March 29, 1956
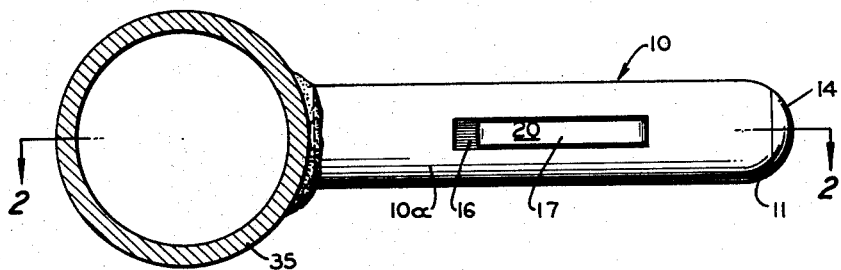
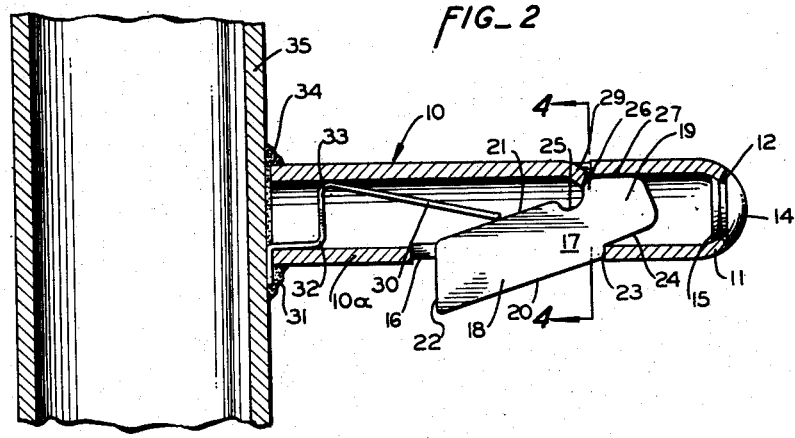
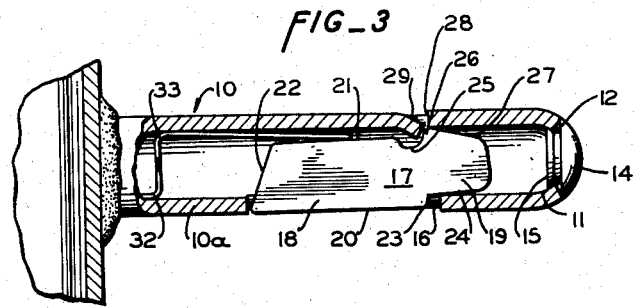
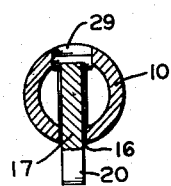
INVENTOR.
DAVID E. BEATTY
BY *Henry Gifford Hardy*
ATTORNEY

United States Patent Office 2,847,259
Patented Aug. 12, 1958

2,847,259

SCAFFOLD BRACE FASTENING MEANS

David E. Beatty, Hillsborough, Calif.

Application March 29, 1956, Serial No. 574,765

3 Claims. (Cl. 304—40)

This invention relates to means for fastening a cross-bracing to the uprights of the end members in portable scaffold construction, and, particularly, to a positive-acting locking stud.

In setting up portable scaffolding it has been customary to secure the crossbraces to the end members by slipping them over threaded studs, which are welded or otherwise secured to the uprights of the end members. Thus, when the braces were in position on the stud of the end member, to retain them in position, it was necessary to turn up a wing nut to the locked position. It is readily understood that such an operation requires considerable manual labor and is time-consuming, both of which conditions are costly. Also, when dismantling of the scaffold is required, the process has to be reversed with the consequent doubling of the time and labor. In addition, the slipping of the braces over the threaded studs frequently causes stripping of or deforming the threads so that the wing nuts will not either operate to lock the brace in position or be turned up so that locking can result.

Accordingly, it is an object of the present invention to provide upright members with appropriately positioned integral studs, having positive spring locking means.

It is a further object of the present invention to provide a means for locking crossbraces in position on uprights, which is fast, safe and sure.

It is a further object of the present invention to provide an integral upright and self-locking stud for crossbracing, which is light in weight, but strong.

It is another object of the present invention to provide a crossbrace locking means, which is easy and quick to operate, both in the assembly of scaffolding and in the dismantling thereof.

Another object is to provide means for holding crossbraces to the uprights of end members which is not dependent upon threads and wing nuts.

Further objects are to provide a construction of maximum simplicity, economy, and ease of manufacture, also such further objects, advantages and capabilities as will fully appear and as are inherently possessed by the device and the invention described herein.

The invention further resides in the combination, construction and arrangement of parts illustrated in the accompanying drawing, and while there is shown therein a preferred embodiment thereof, it is to be understood that the same is merely illustrative of the invention and that the invention is capable of modification and change, and comprehends other details of construction without departing from the spirit thereof, or the scope of the appended claims.

Referring to the drawings:

Figure 1 is a transverse section of the tubular upright looking upwardly and showing the stud portion in elevation from the underside.

Figure 2 is a vertical section taken on the line 2—2 of Figure 1, showing the dog member in the operative position.

Figure 3 is a view similar to Figure 2, but showing the dog member in the inoperative position.

Figure 4 is a transverse vertical section taken on the line 4—4 of Figure 2.

Referring now to the drawings in which like reference numerals refer to similar parts in the several views, the locking stud 10 of the present invention is formed of tubular metal 10a cut to the appropriate length. The outer end is rounded inwardly as at 11, but not closed. The rounding, accordingly, is accomplished without weakening or thinning the wall sections in making the appropriate curve. The aperture 12 left by the rounding of the end at 11 is closed from the outside by an aluminum rivet 14 with its inner end 15 deformed to engage the inner face of the rounded portion 11. The head of the rivet 14, being of greater diameter than the shank portion, effectively laps and seals the aperture 12 from the outside.

The tubular stud 10 is also provided with a longitudinal slot 16, which pierces the wall thereof and provides a window for a portion of the length of the stud. Retained within the tubular stud 10 is a dog member 17 which is solid and has a thickness slightly less than the width of the slot 16. The dog member 17, being solid, is rugged and strong, so that there is no danger of failure from any cause. The dog 17 has two distinct portions, one a blade portion 18 and the other a head portion 19. The longitudinal opposite edges of the dog blade portion 18 are substantially parallel and represent a width substantially equal to the inner diameter of the tube 10. The width, however, is not determined by the internal diameter of the tube 10, but rather must be gauged so that the edge 20, when moved to the inoperative position shown in Figure 3, will be substantially in the same plane as the slot 16, while the inner edge 21 will be spaced from the opposite inner wall of the stud 10. The outer end 22 is angled so that when the dog is in its operative locking position, the face 22 will be substantially perpendicular to the plane of the slot 16. Obviously, the length of the face 20 is slightly less than the length of the slot 16. The head portion 19 of the dog 17 is stepped inwardly to provide a shoulder 23, which acts as a stop, as will hereinafter be explained. The depth of the step 23 is sufficient so that the face 24 is substantially parallel with the inner wall of the tube 10 when the dog is in the nonoperative position, as shown in Figure 3. The rear face 21 of the dog continues toward the head in the form of an inwardly directed dip or notch 25. The purpose of the notch 25 will be defined hereinafter. The notch continues and leads into a rounded projecting portion 26, which, in the nonoperative position shown in Figure 3, engages the opposite inner surface of the tube. The curve 26 leads directly into a sloping face 27 which is substantially a straight section and engages the inner face of the stud 10 when the dog 17 is in the operative locking position shown in Figure 2.

To retain the dog 17 within the tubular stud 10 in its correct position, the dog 17 is projected headfirst within the slot 16 until it assumes the position shown in Figure 3. The tube is then struck with a sharp instrument which makes a transverse cut 28 in the stud 10 adjacent the notch 25 and at the same time depresses one side of the cut 29, locking the dog 17 in its proper position in the stud 10. The shape of the head 19 is such that once the depressed cut portion 29 is formed, the dog 17 cannot be removed but retains freedom of action.

While it is possible to use the stud member in this form and permit it to act by gravity by placing the slot 16 downwardly in a vertical plane, it should be realized that the operation would not be satisfactory in all instances because unevennesses in the main support would affect the operation and effectiveness of the locking. Accordingly, a positive locking means is provided by a leaf spring 30. The leaf spring 30 is merely a ribbon of spring metal, having a foot portion 31 which is bent at right angles to engage the open end of the tube 10. It is also bent at 32 and 33 so that the bends engage the inner face of the tube at diametrically opposite sides. The other free end of the spring member 30 engages the rear face 21 of the dog 17, constantly urging it outward to the locked position shown in Figure 2. The spring member 30 is preformed and inserted into the open end of the tubular stud 10 into operative engagement shown in Figure 2.

The assembled pin member is then welded as at 34 in position on the vertical support 35 of the end frame in portable scaffolding and the like, as shown particularly in Figure 2. Although gravity is not relied upon for the operation of the locking by the pin, it is preferred to weld the stud 10 in position with the slot 16 downwardly so that mortar, paint, dirt and other debris will not drop into the slot and limit or destroy the efficiency of this locking means.

The welding of the stud 10 to the upright 35 secures the spring member 30 in position permanently and makes the stud 10 and upright 35 a unitary structure.

All that is necessary to do in locking crossbraces to the end frames in the erection of scaffolding, is to slide the opening of the crossbrace over the stud 10 with sufficient force to depress the dog 17 to the position shown in Figure 3, permitting the crossbrace end to slide past the dog. Urged by the spring 30, the dog 17 will immediately assume the locked position shown in Figure 2, and retain the crossbrace end between its face 22 and the upright 35. The crossbrace member cannot be inadvertently dislodged from the locked position. The shoulder 23 of the dog 17 bears against the end of slot 16 in the operative position and insures against being pushed out of position laterally. However, all that is required to remove the crossbrace from the pin 10 is to depress the dog 17 sufficiently into the slot 16 to permit the aperture of the brace member to pass thereover.

It will be seen that the advantages claimed for this invention have been accomplished by the structure herein shown and described.

I claim:

1. A scaffold locking means comprising in combination a tubular pin member rounded and closed at one end and open at the other and having a longitudinal slot through the wall thereof spaced from said ends, a solid dog member inserted through said slot with its outer end beyond the terminal of said slot being freely retained within said tube, said slot being shorter in length than the dog member passing therethrough, said dog having its edge adjacent said slot shaped to pivot about the outer terminal of said slot, leaf spring means having one end bearing against said dog within said tube on the edge opposite to the slot adjacent its rear end and urging a portion thereof through said slot, intermediate angular bends therein bearing against diametrically opposed points within said tube, and the other end having a foot portion bent externally over the open end of said tubular pin, and an upright scaffold member, said pin and said spring foot portion being welded as a unit to and made integral with said upright member, the said slot being positioned vertically downwardly.

2. A scaffold locking means comprising in combination a tubular stud member rounded at one end and having a longitudinal slot through the wall thereof spaced from the ends, a rivet closing the rounded end of said stud, a solid dog member inserted through said slot with its outer end beyond the terminal of said slot being freely retained within said stud, said dog having its edge adjacent said slot shaped to pivot about the outer terminal of said slot, leaf spring means fitted within said stud, one end of which bears against the dog member on the edge opposite to the slot adjacent its rear end and the other bent over the wall of the open end of said stud, and an upright scaffold member, said stud and said bent over spring portion being welded as a unit to and made integral with said upright member, the said slot being positioned vertically downwardly.

3. A scaffold locking means comprising in combination a tubular stud member rounded at one end and having a longitudinal slot through the wall thereof spaced from the ends, a rivet closing the rounded end of said stud, a solid dog member inserted through said slot and freely retained within said stud, said dog having its edge adjacent said slot shaped to pivot about the outer terminal of said slot said dog having a blade portion and a head portion separated at the rear thereof by a notch along its edge opposite to the slot, said head portion extending outwardly within said tubular stud beyond the outer terminal of said slot and with the lower edge of said dog member being shaped to pivot about the outer terminal of said slot, a cut and depression in said tubular stud adjacent said notch and cooperating therewith to prevent withdrawal of said dog member, leaf spring means fitted within said stud, one end of which bears against the blade portion of said dog member on the edge opposite to the slot and adjacent the rear end thereof, urging it through the said slot, and the other bent over the wall of the open end of said stud, and an upright scaffold member, said stud and said bent over spring portion being welded as a unit to and made integral with said upright member, the said slot being positioned vertically downwardly.

References Cited in the file of this patent

UNITED STATES PATENTS

| | | |
|---|---|---|
| 695,299 | Freeland | Mar. 11, 1902 |
| 1,298,666 | Church | Apr. 1, 1919 |
| 1,646,345 | Carr | Oct. 18, 1927 |
| 2,698,552 | Smith | Jan. 4, 1955 |
| 2,701,167 | Kirkpatrick | Feb. 1, 1955 |